Jan. 17, 1967    M. MOLNAR    3,298,266
TUBE CUTTING MACHINE
Filed June 15, 1965    4 Sheets-Sheet 1

INVENTOR.
MICHAEL MOLNAR
BY McCoy, Greene,
Medert & Te Grotenhuis
ATTORNEYS

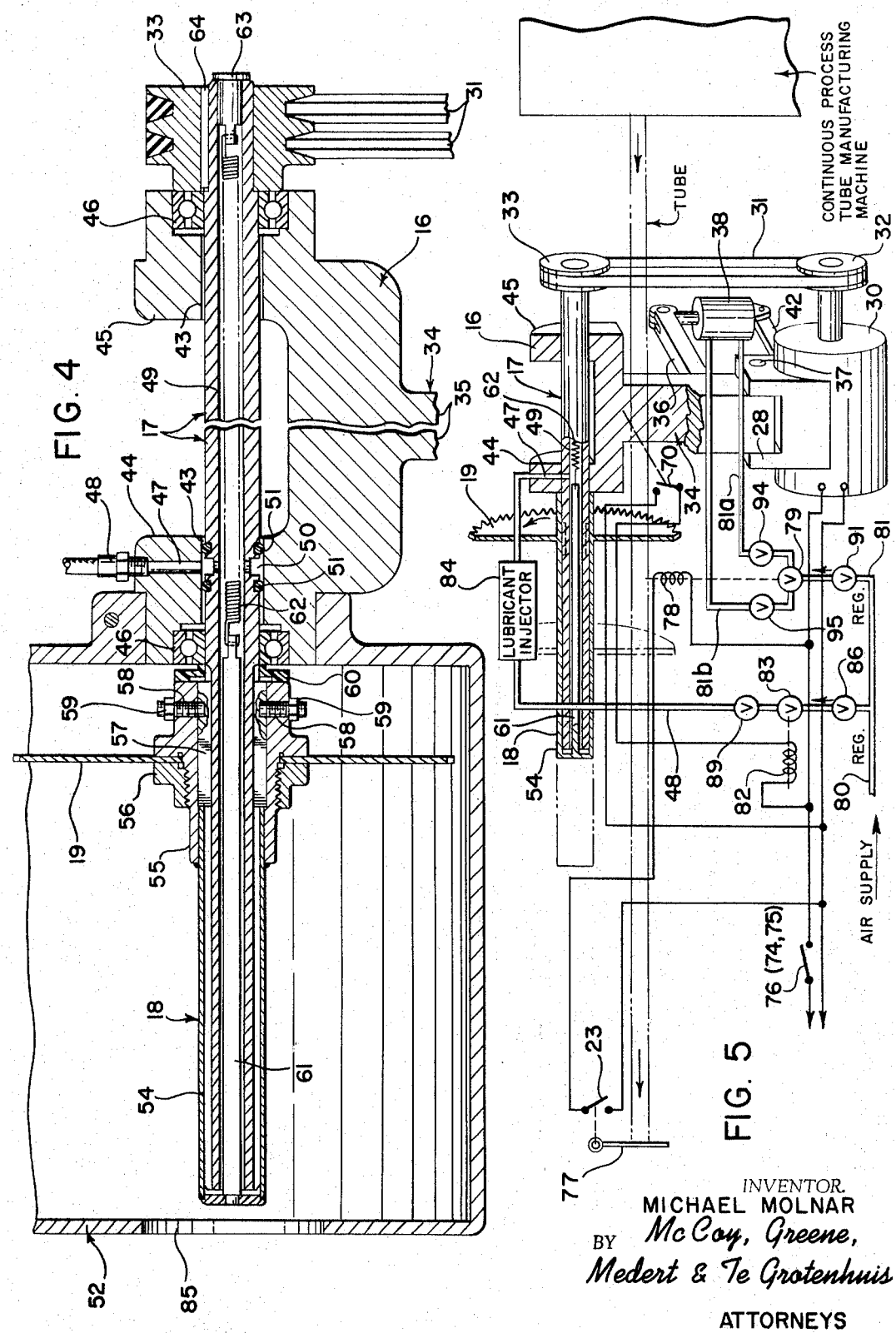

United States Patent Office 3,298,266
Patented Jan. 17, 1967

3,298,266
TUBE CUTTING MACHINE
Michael Molnar, 3163 W. 138th St.,
Cleveland, Ohio 44120
Filed June 15, 1965, Ser. No. 464,003
19 Claims. (Cl. 83—311)

This invention relates to tube cutting machines and more particularly to machines which cut paper or plastic tubing which is manufactured by a continuous process method.

Tubing made from paper or plastic is frequently used in short segments as the center, hollow cores around which various substances are wrapped, the many types of paper and foils commonly used in homes being good examples of such substances. Other tubing is used as a container in which substances are placed for storage or shipping. Many other uses of tubes could be given, for these are merely illustrative.

Such tubing is usually manufactured by a continuous process method, and requires, therefore, that the tubing be cut to desired lengths. This invention relates to a machine which does this cutting.

Such a machine must be capable of moving its cutting blade into the path of the advancing tube so that the cut can be made, and also be capable of removing the blade from the path of the tube so that the advancing tube will not be shedded as it advances. Also, the cutting blade should be capable of moving parallel to the axis of the tube so that a square cut is obtained when the blade is in contact with the tube. If the tubing to be cut is of small diameter and has thin walls, the axial pressure exerted by the blade on the end of the tube should not be so great that the tube will buckle or collapse, this being a problem especially when the tubing is paper and still wet from the manufacuring process. When the tube is to be cut into small segments it is desirable to have the cutting machine cycle rapidly. These and other features have long been recognized as being desirable in machinery of this kind.

Machines to cut tubes have been available for many years, but none was completely suitable for a variety of reasons. Many of the prior machines were undully complicated, requiring many linkages, gears and other mechanical elements to perform the desired task. In some of the prior machines the cutting blade was in a fixed position with respect to the shaft which drove it, and so to move the cutting blade parallel to the advancing tubing required that the shaft and the entire cradle in which the shaft was mounted be moved as well. Also, the cradle did not always return to the same position, resulting in non-uniform lengths of tube segments. Moving this large mass not only required much power and many mechanical elements, but also required much time as well, due to the large inertia; thus the machines cycled slowly. The large mass of the cradle also increased the time required for the cradle to advance from a stationary, non-cutting position toward the advancing tubing so that a cut could begin, thereby further reducing the cycling speed of the machine.

Other of the prior machines allowed the cutting blade to move parallel with respect to the axis of the drive shaft, but some arm was required to drive the blade to achieve this movement.

The previous machines which permitted the blade to move along the drive shaft provided means for returning the blade to its initial position after the cut had been made, these means frequently consisting of a spring wrapped around the outside of the drive shaft and adapted to act upon the cutting blade. This arrangement frequently caused the spring to become entangled with the advancing tubing.

Another undesirable feature of the older machines was that the lubrication required for the drive shaft often resulted in splattering on the tubes, and ruined one or more tubes with each lubrication.

This invention provides a machine in which the cutting blade is mounted on a gimbal, the gimbal in turn being mounted upon, and freely slidable along, the drive shaft. Air is forced through a central bore in the drive shaft to blow against the inside surface of the end of the gimbal, thereby causing the gimbal and the cutting blade to move along, and parallel to the axis of, the drive shaft. With such a small mass involved, the gimbal moves quickly along the shaft, and the speed may be varied simply by varying the air pressure. A tension spring inside the central bore of the drive shaft returns the gimbal when the air pressure is released. The air escapes between the inside surface of the gimbal and the outside surface of the drive shaft, thereby causing the gimbal to ride on a cushion of air and thereby making lubrication continuous and unobjectionable if a fine spray of oil is injected into the air.

With the air pressure which is injected into the bore of the drive shaft being variable, so also is the pressure which the cutting blade exerts against the end of a tube, since this air pressure counteracts the force exerted on the gimbal by the spring. Thus, this machine may be used with the tubing having very small diameters and very small wall thicknesses.

The reduced mass of the cradle also permits faster cycling of the cutting blade in a plane perpendicular to the axis of the tubing. A four-way air valve, operated by a triggering mechanism such as a microswitch or photoelectric cell, causes the cradle to advance toward, and retract from, the advancing tubing at speeds which are variable and independent of one another.

These and other objects and advantageous features of the invention will become apparent as the nature of the invention is better understood from the following detailed description, taken in conjunction with the accompanying drawings, wherein like reference characters denote corresponding parts, and wherein:

FIGURE 4 is a sectional view, taken along line 4—4 of FIGURE 1 and showing details of the cradle, gimbal and cutting blade; and, FIGURE 5 is a schematic diagram, showing the electrical and air circuits for the tube cutting machine.

Figure 1:
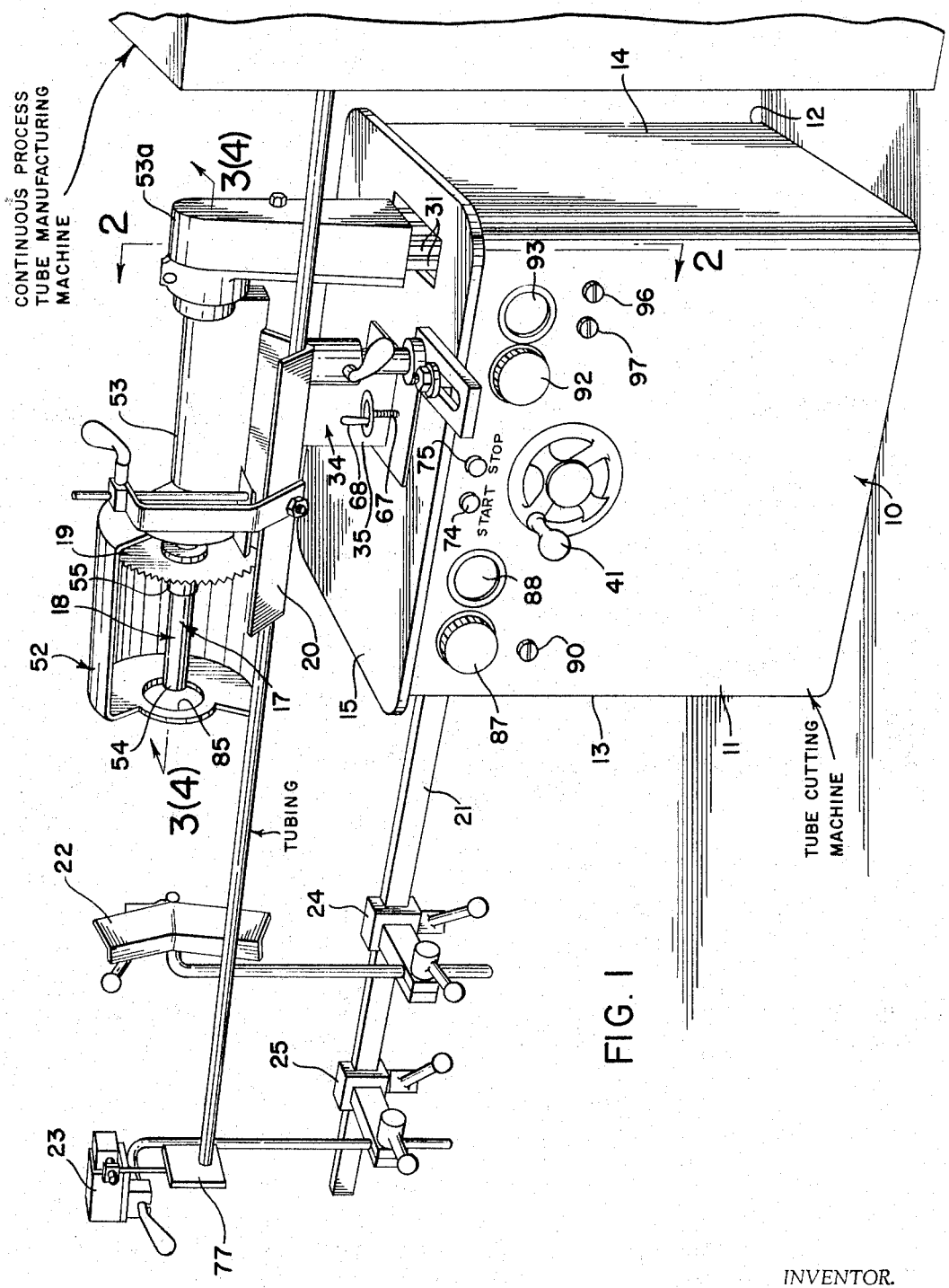
FIGURE 1 is a perspective view of the cutting machine, showing the tubing advancing in front of the cutting machine as it comes from a continuous process manufacturing machine.

Referring now to FIGURE 1, there is shown the base 10 of the cutting machine which is generally rectangular in shape, having a front 11, back 12, left and right sides 13 and 14, respectively, and top 15. Projecting above the top 15 is a cradle 16 in which is mounted the drive shaft 17. The gimbal 18, on which is mounted the cutting blade 19, is shown on the end of the drive shaft 17. A V-shaped support 20 for the tube is shown secured to the top 15 of the machine. Extending from the left side 13 of the machine is a bar 21 on which are mounted a guide 22 for the tubing and a microswitch 23 on suitable mounting supports 24 and 25, respectively. The tubing is shown advancing out of the continuous process manufacturing machine on the right of the cutting machine.

Figure 2:
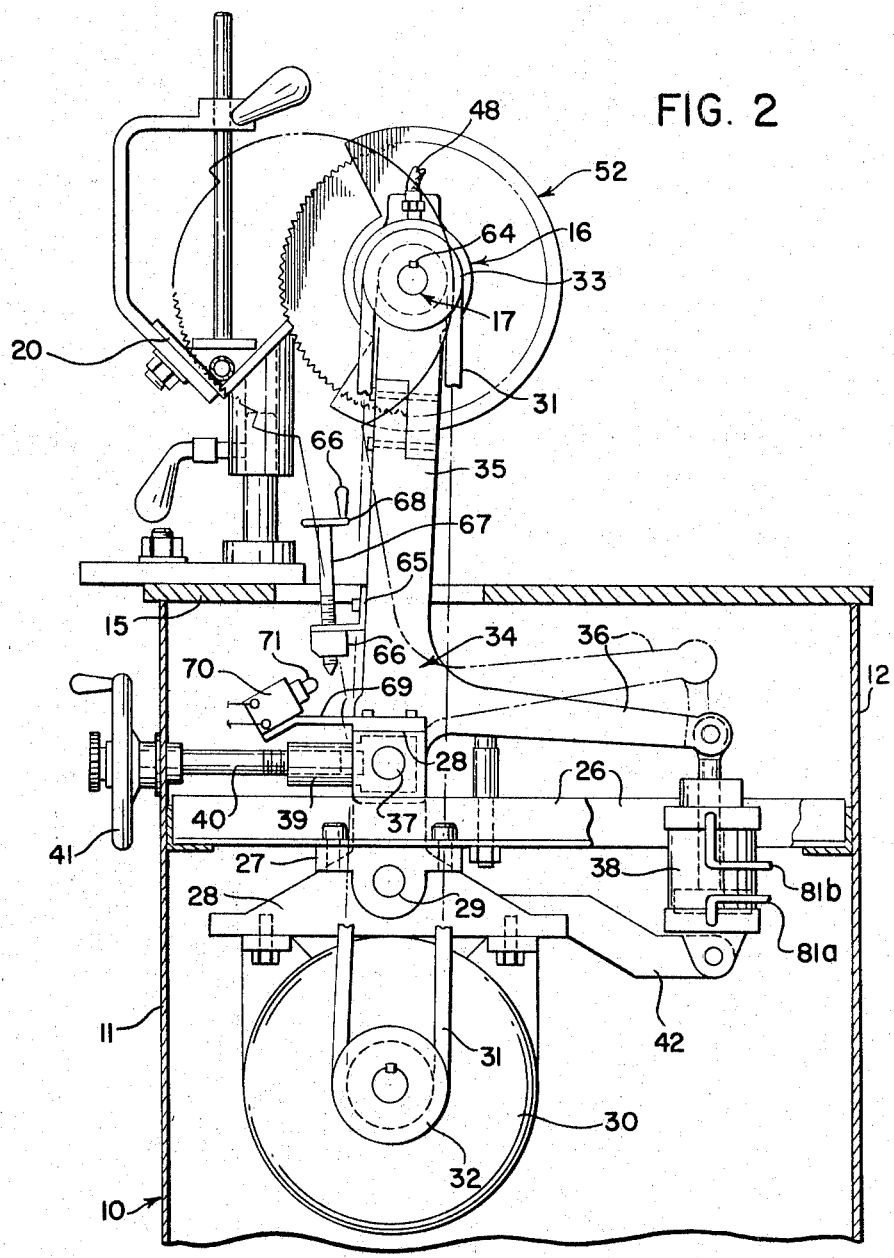
FIGURE 2 is a sectcional side view of the cutting machine, taken along line 2—2 of FIGURE 1 and showing the blade-carrying cradle in a stationary, non-cutting position, and also showing the cradle, in phantom lines, in position as it cuts the tube.
Figure 3:
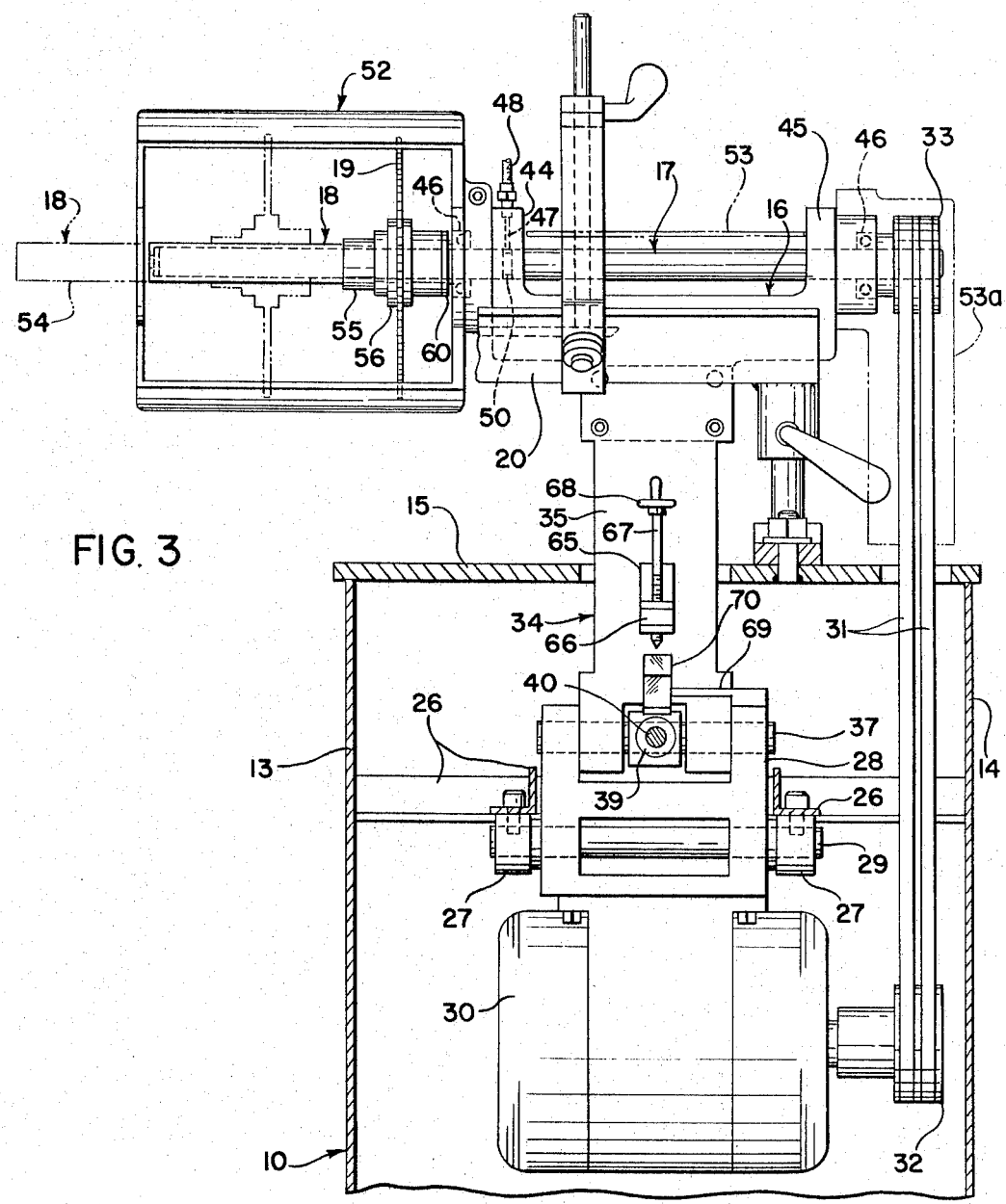
FIGURE 3 is a sectional front view of the cutting machine, taken along line 3—3 of FIGURE 1 and showing the frame, motor, cradle, drive shaft, gimbal and cutting blade in the position assumed at the beginning of a cutting cycle, and showing also the gimbal and blade in phantom lines extended along the drive shaft during the cutting cycle.

FIGURES 2 and 3 show that inside the base 10 there is a structural frame 26 from which mounting brackets 27 are suspended. Extending through appropriate openings in the brackets 27 and through the arms of a mounting bracket 28 is a pivot shaft 29. Mounted on the bracket 28 is an electric motor 30. Suitable belts 31 connect pulley wheels 32 and 33 mounted on the ends of the motor 30 and drive shaft 17, respectively, so that the motor 30 can turn the shaft 17.

A yoke 34, one arm 35 of which extends upwardly to support the cradle 16, is free to rotate about a pivot shaft 37. The other arm 36 of the yoke 34 is pivotably connected to the piston rod of an air cylinder 38 as shown in FIGURE 2. An adjusting connection 39, which is also connected to the pivot shaft 37, engages a shaft 40 which projects through an appropriate opening in the front 11 of the base 10. A hand wheel 41 is affixed on the end of the shaft 40. The wheel 41, shaft 40 and connection 39 cooperate so that when the wheel 41 is turned, the pivot shaft 37, yoke 34 and mounting bracket 28 all rotate about pivot shaft 29, thus permitting the position of the cradle 16 to be varied with respect to the tubing to be cut. (The position of the cradle 16 when the machine is not operating, which is shown in FIGURE 2 by solid lines, will hereinafter be referred to as the "stationary, non-cutting position.") To facilitate such rotation, the air cylinder 38 is pivotally connected to an extension 42 of the mounting bracket 28.

FIGURES 3 and 4 show the details of the cradle 16 which is mounted at the top of arm 35 of yoke 34. The cradle 16 is essentially U-shaped, except for a portion which projects downwardly from the bottom of the U to form the connection with the arm 35. Cylindrical openings 43 in each of the arms 44 and 45 of the cradle 16 permit the drive shaft 17 to extend through the cradle 16. Bearings 46 mounted in these arms permit the easy rotation of the shaft 17.

As is shown in FIGURE 4, the arm 44 is tapped as at 47 to permit a branch air line 48 to supply air to the drive shaft 17. The shaft 17 has a central bore 49, and is also provided with a manifold 50, surrounded by appropriate seals 51 in the arm 44, to permit the air from the line 48 to enter the bore 49.

Mounted on the outside of arm 44 is a blade guard 52. Also, between the arms 44 and 45 of the cradle 16 is a cover 53 so that the drive shaft 17 will not be exposed. A safety cover 53a likewise covers the belts 31.

The gimbal 18, as shown in FIGURE 4, is comprised of an air cylinder or sleeve 54, a blade holder 55 and a blade holder clamp 56. The blade holder 55 is rigidly secured to the sleeve 54, and engages keys 57 mounted in the drive shaft 17 so that the shaft 17 may turn the gimbal 18. The cutting blade 19 is held in place between the holder 55 and the clamp 56, the clamp 56 being threaded over the end of the holder 55. Set screws 58 and nuts 59 associated with the holder 55 connect the holder 55 with the key 57 so that the holder 55 and key 57 travel together. A bumper 60, secured on the drive shaft 17 near the cradle 16, provides a cushion against which the gimbal 18 may come to rest at the end of a cutting cycle.

A spring connecting shaft 61 is shown in FIGURE 4 in the central bore 49 of the drive shaft 17. One end of the shaft 61 is attached to the inner end of the sleeve 54, while the other end is connected to a tension spring 62. The other end of spring 62 is joined to a spring spindle 63 which projects out of the shaft 17. At the end of the shaft 17 near the spring spindle 63 is a key 64 so that the pulley wheel 33 can drive the shaft 17.

Referring now to FIGURES 2 and 3, a small angle bracket 65 mounted on the arm 35 of yoke 34 provides a mounting for a threaded sleeve 66. A threaded shaft 67, which cooperates with sleeve 66, extends upward and through a slotted opening in the top 15 of the base 10. A hand wheel 68 is affixed to the top of the shaft 67. Extending outward from mounting bracket 28 is a support bracket 69 upon which is mounted a microswitch 70 having a triggering button 71. It can be seen from FIGURES 2 and 3 that as the yoke 34 rotates about pivot shaft 37 to advance the cutting blade 19 into the cutting position, the tapered end of shaft 67 will come to bear against the button 71 of microswitch 70, which in turn will close microswitch 70. The exact time during the motion of the yoke 34 when microswitch 70 is closed can be varied by turning the hand wheel 68; also, this time is not changed by an adjustment of hand wheel 41, for that adjustment causes both yoke 34 and mounting bracket 28 to rotate about pivot shaft 29 and therefore does not disturb the relative positions of the shaft 67 and microswitch 70.

The operation of the machine can now be explained by referring to the drawings and particularly to FIGURE 5. The electric motor 30 is started and stopped by pressing buttons 74 and 75, respectively, which are mounted on the front 11 of the base 10, as shown in FIGURE 1. When button 74 is pressed, switch 76 is closed and motor 30 supplied with electrical current. With the motor 30 running, the yoke 34 and cradle 16 in the position indicated by solid lines in FIGURE 2, and the gimbal 18 and cutting blade 19 in the position shown in FIGURE 4 and by solid lines in FIGURE 3, the tubing advances from the manufacturing machine, past the cutting blade 19, and eventually strikes a paddle 77 mounted on the arm of microswitch 23, causing microswitch 23 to close. This in turn energizes solenoid 78, which opens a four-way air valve 79 so that air from a supply line 80 passing through a branch line 81 may flow through sub-branch line 81a, pushing the piston of cylinder 38 upward. This causes the yoke 34 to rotate about the pivot shaft 37, and as this occurs the end of shaft 67 will come to bear against triggering button 71 of microswitch 70 causing microswitch 70 to close. When closed, microswitch 70 energizes a solenoid 82, which then causes valve 83 to open and air to flow from the main supply line to the branch line 48. A lubricant injector 84 injects a fine lubricant spray into the air as it passes through branch line 48. The air from line 48 enters the central bore 49 of the drive shaft 17 via the tap 47 and the manifold 50. This air acts against the end of the sleeve 54, pushing the gimbal 18 out along the shaft 17. An opening 85 in the end of the blade guard 52 permits the sleeve 54 of the gimbal 18 to extend beyond the guard 52, as shown by phantom lines in FIGURE 3. Thus, it can be seen that when the advancing tube strikes the paddle 77, the yoke 34 and cradle 16 move from the stationary, non-cutting position to the position indicated by phantom lines in FIGURE 2 so that the blade 19 may cut the tube. While the yoke 34 and cradle 16 are thus rotating, the gimbal 18 and blade 19 will begin to move along the drive shaft 17 so that the blade 19 will neither bear against the end of the tubing with such force as to buckle the tubing, nor shred the tubing as the tubing advances toward the blade.

When the tube is cut, the segment so cut drops and may be caught in a convenient receptacle (not shown in any of the drawings). As it falls, paddle 77 returns to its vertical position and microswitch 23 operates air cylinder 38 to cause air to flow through sub-branch 81b and force the piston of cylinder 38 downward. As the yoke 34 and cradle 16 rotate about pivot shaft 37 returning to the stationary, non-cutting position, microswitch 70 opens and causes valve 83 to close, thereby shutting off the supply of air to air line 48. When this occurs, the spring 62 pulls the gimbal 18 back along the drive shaft 17 in the direction of the cradle to complete the cutting cycle.

Having thus described a cycle of the machine's cutting operation, there remain to be described only some of the refined details of the machine. The air pressure supplied to the valve 83 from the supply line 80 may be varied by a valve 86, as shown in FIGURE 5, which is controlled by a convenient adjusting knob 87 on the front 11 of the base 10; a pressure indicator 88 shows the air pressure between valves 86 and 83. The amount of air passing from valve 83 to the gimbal 18 may likewise be varied by a second valve 89, which is controlled by an adjusting screw 90 on the front 11 of the base 10. While the valve 83 is mounted inside the base 10 and, therefore, not easily accessible, the valves 86 and 89 which may be controlled by an operator from the outside of the machine offer easy but yet very sensitive control of the air supplied to the gimbal 18.

Likewise, the air pressure supplied to the four-way valve 79 may be varied by a valve 91 which is controlled by an adjusting knob 92 on the front 11 of the base 10, a pressure indicator 93 showing the air pressure between valves 91 and 79. Valves 94 and 95, positioned on subbranches 81a and 81b, respectively, and controlled from the front 11 of the base 10 by adjusting screws 96 and 97, respectively, offer easy and sensitive adjustment of the air flow supplied to the air cylinder 38, yet make the air which pushes the piston of cylinder 38 upward independent of the air which pushes the piston downward. Thus, the speed at which the cradle 16 advances the blade 19 from the stationary, non-cutting position to the cutting position may be varied, as can the speed of the return movement, and the two speeds may be varied independently of one another. Furthermore, entirely independent from either of these is the speed at which the gimbal 18 moves along the drive shaft 17, a speed which is also variable.

As stated above, the position of the yoke 34 and the cradle 16 at the time the valve 83 opens to cause gimbal 18 to begin to move along drive shaft 17 may be varied by turning the hand wheel 68.

While the distance along the drive shaft 17 which the gimbal 18 moves is governed by the air pressure supplied to the drive shaft 17 and gimbal 18 in the machine shown in the drawings, a simple stop mounted on the inside of the blade guard 52 could also be used to limit the distance traveled by the gimbal 18. Such a stop could be any simple device which would bear against the cutting blade 19 or the gimbal 18, and could be positioned wherever desired.

While the spring 62 is shown as providing the means by which the gimbal 18 and blade 19 are returned after the tube segment is cut, this is but the preferred method of accomplishing this result. Should it be desired, air could be used for this purpose, just as air now drives the gimbal outward while the cut is being made. One way to achieve this result would be to provide a second gimbal 18a on the right end of drive shaft 17, divide the bore 49 into two separate chambers by inserting a divider in the bore 49 and tap the arm 45 with a second branch line 48a; a four-way valve could be substituted for the present valve 83, and an additional valve 89a inserted in the second branch line 48a.

The device used to trigger the cutting machine and begin a cutting cycle has been shown as a paddle 77 attached to microswitch 23. Obviously, some other device such as a photoelectric cell could as easily be used without changing the invention.

The microswitch 70 has been shown mounted inside the base 10, with hand wheel 68 provided to vary the time when microswitch 70 is triggered with respect to microswitch 23. This is but a matter of choice. Microswitch 70 could as easily be located elsewhere, such as with microswitch 23, is which instance the paddle 77 might be attached to a shaft on which were mounted two cams, one to operate each of the two microswitches.

The machine could also be modified to cut tubing moving from left to right, rather than from right to left as now shown in the drawings, by interchanging the pulley wheel 33 and blade guard 52, and reversing the drive shaft 17. The pulley wheel 32 on the motor 30 would also have to be moved, as would the bar 21 and other apparatus shown in FIGURE 1 on the left of the machine.

While there has been described herein and illustrated in the accompanying drawings a presently preferred embodiment of the invention, it is to be understood that the various modifications described above, and others also, which depart from the illustrated embodiment may be adopted without departing from the spirit and scope of this invention.

I claim:

1. A tube cutting machine comprising a base, a motor, a cradle mounted on the base, a drive shaft mounted within the cradle, means for causing the motor to turn the drive shaft, a gimbal mounted on the drive shaft and capable of being driven by the shaft, a cutting blade mounted on the gimbal, means for causing the cradle to move from a stationary, non-cutting position toward the axis of the tube, and return, and, means for causing the gimbal to move parallel with respect to the axis of the drive shaft, in which the speeds of movement of the cradle from the stationary, non-cutting position to the tube, and return, are variable and independent of one another.

2. A tube cutting machine comprising a base, a motor, a cradle mounted on the base, a drive shaft mounted within the cradle, means for causing the motor to turn the drive shaft, a gimbal mounted on the drive shaft and capable of being driven by the shaft, a cutting blade mounted on the gimbal, means for causing the cradle to move from a stationary, non-cutting position toward the axis of the tube, and return, and, means for causing the gimbal to move parallel with respect to the axis of the drive shaft, in which the speeds of movement of the cradle from the stationary, non-cutting position to the tube, and return, are variable and independent of one another, and the gimbal moves away from the cradle and parallel with respect to the axis of the drive shaft in response to air flowing through an internal bore in the drive shaft and blowing against the inside of the end of the gimbal.

3. A tube cutting machine comprising a base, a motor, a cradle mounted on the base, a drive shaft mounted within the cradle, means for causing the motor to turn the drive shaft, a gimbal mounted on the drive shaft and capable of being driven by the shaft, a cutting blade mounted on the gimbal, means for causing the cradle to move from a stationary, non-cutting position toward the axis of the tube, and return, and, means for causing the gimbal to move parallel with respect to the axis of the drive shaft, in which the speeds of movement of the cradle from the stationary, non-cutting position to the tube, and return, are variable and independent of one another, and the speed with which the gimbal moves along the drive shaft is variable.

4. A tube cutting machine comprising a base, a motor, a cradle mounted on the base, a drive shaft mounted within the cradle, means for causing the motor to turn the drive shaft, a gimbal mounted on the drive shaft and capable of being driven by the shaft, a cutting blade mounted on the gimbal, means for causing the cradle to move from a stationary, non-cutting position toward the axis of the tube, and return, and means for causing the gimbal to move parallel with respect to the axis of the drive shaft, in which the speeds of movement of the cradle from the stationary, non-cutting position to the tube, and return, are variable and independent of one another, and the gimbal moves toward the cradle and parallel with respect to the axis of the drive shaft in response to a spring mounted within the drive shaft and attached to the gimbal.

5. A tube cutting machine comprising a base, a motor, a cradle mounted on the base, a drive shaft mounted within the cradle, means for causing the motor to turn the drive shaft, a gimbal mounted on the drive shaft and capable of being driven by the shaft, a cutting blade mounted on the gimbal, means for causing the cradle to move from a stationary, non-cutting position toward the axis of the tube, and return, and, means for causing the gimbal to move parallel with respect to the axis of the drive shaft, in which the speeds of movement of the cradle from the stationary, non-cutting position to the tube, and return, are variable and independent of one another, the gimbal moves away from the cradle and parallel with respect to the axis of the drive shaft in response to air flowing through an internal bore in the drive shaft and blowing against the inside of the end of the gimbal, and the speed with which the gimbal moves along the drive shaft is variable.

6. A tube cutting machine comprising a base, a motor, a cradle mounted on the base, a drive shaft mounted within the cradle, means for causing the motor to turn the drive shaft, a gimbal mounted on the drive shaft and capable of being driven by the shaft, a cutting blade mounted on the gimbal, means for causing the cradle to move from a stationary, non-cutting position toward the axis of the tube, and return, and, means for causing the gimbal to move parallel with respect to the axis of the drive shaft, in which the speeds of movement of the cradle from the stationary, non-cutting position to the tube, and return, are variable and independent of one another, the gimbal moves away from the cradle and parallel with respect to the axis of the drive shaft in response to air flowing through an internal bore in the drive shaft and blowing against the inside of the end of the gimbal, and the gimbal moves toward the cradle and parallel with respect to the axis of the drive shaft in response to a spring mounted within the drive shaft and attached to the gimbal.

7. A tube cutting machine comprising a base, a motor, a cradle mounted on the base, a drive shaft mounted within the cradle, means for causing the motor to turn the drive shaft, a gimbal mounted on the drive shaft and capable of being driven by the shaft, a cutting blade mounted on the gimbal, means for causing the cradle to move from a stationary, non-cutting position toward the axis of the tube, and return, and, means for causing the gimbal to move parallel with respect to the axis of the drive shaft, in which the speeds of movement of the cradle from the stationary, non-cutting position to the tube, and return, are variable and independent of one another, the speed with which the gimbal moves along the drive shaft is variable, and the gimbal moves toward the cradle and parallel with respect to the axis of the drive shaft in response to a spring mounted within the drive shaft and attached to the gimbal.

8. A tube cutting machine comprising a base, a motor, a cradle mounted on the base, a drive shaft mounted within the cradle, means for causing the motor to turn the drive shaft, a gimbal mounted on the drive shaft and capable of being driven by the shaft, a cutting blade mounted on the gimbal, means for causing the cradle to move from a stationary, non-cutting position toward the axis of the tube, and return, and means for causing the gimbal to move parallel with respect to the axis of the drive shaft in which the gimbal moves away from the cradle and parallel with respect to the axis of the drive shaft in response to air flowing through an internal bore in the drive shaft and blowing against the inside of the end of the gimbal.

9. A tube cutting machine comprising a base, a motor, a cradle mounted on the base, a drive shaft mounted within the cradle, means for causing the motor to turn the drive shaft, a gimbal mounted on the drive shaft and capable of being driven by the shaft, a cutting blade mounted on the gimbal, means for causing the cradle to move from a stationary, non-cutting position toward the axis of the tube, and return, and means for causing the gimbal to move parallel with respect to the axis of the drive shaft, in which the gimbal moves away from the cradle and parallel with respect to the axis of the drive shaft in response to air flowing through an internal bore in the drive shaft and blowing against the inside of the end of the gimbal, and the speed with which the gimbal moves along the drive shaft is variable.

10. A tube cutting machine comprising a base, a motor, a cradle mounted on the base, a drive shaft mounted within the cradle, means for causing the motor to turn the drive shaft, a gimbal mounted on the drive shaft and capable of being driven by the shaft, a cutting blade mounted on the gimbal, means for causing the cradle to move from a stationary, non-cutting position toward the axis of the tube, and return, and means for causing the gimbal to move parallel with respect to the axis of the drive shaft, in which the gimbal moves away from the cradle and parallel with respect to the axis of the drive shaft in response to air flowing through an internal bore in the drive shaft and blowing against the inside of the end of the gimbal, and the gimbal moves toward the cradle and parallel with respect to the axis of the drive shaft in response to a spring mounted within the drive shaft and attached to the gimbal.

11. A tube cutting machine comprising a base, a motor, a cradle mounted on the base, a drive shaft mounted within the cradle, means for causing the motor to turn the drive shaft, a gimbal mounted on the drive shaft and capable of being driven by the shaft, a cutting blade mounted on the gimbal, means for causing the cradle to move from a stationary, non-cutting position toward the axis of the tube, and return, and means for causing the gimbal to move parallel with respect to the axis of the drive shaft comprising a source of air, means for introducing air from the source into a bore in the drive shaft, and means for causing the air introducing means to function and cease functioning.

12. A tube cutting machine comprising a base, a motor, a cradle mounted on the base, a drive shaft mounted within the cradle, means for causing the motor to turn the drive shaft, a gimbal mounted on the drive shaft and capable of being driven by the shaft, a cutting blade mounted on the gimbal, means for causing the cradle to move from a stationary, non-cutting position toward the axis of the tube, and return, and means for causing the gimbal to move parallel with respect to the axis of the drive shaft comprising a source of air, means for introducing air from the source into a bore in the drive shaft to cause the gimbal to move away from the cradle, and means for causing the air introducing means to function and cease functioning.

13. A tube cutting machine comprising a base, a motor, a cradle mounted on the base, a drive shaft mounted within the cradle, means for causing the motor to turn the drive shaft, a gimbal mounted on the drive shaft and capable of being driven by the shaft, a cutting blade mounted on the gimbal, means for causing the cradle to move from a stationary, non-cutting position toward the axis of the tube, and return, and means for causing the gimbal to move parallel with respect to the axis of the drive shaft comprising a source of air, means for introducing air from the source into a bore in the drive shaft to cause the gimbal to move away from the cradle, means for causing the air introducing means to function and cease functioning, and spring means to cause the gimbal to move toward the cradle.

14. A tube cutting machine comprising a base, a motor, a cradle mounted on the base, a drive shaft mounted within the cradle, means for causing the motor to turn the drive shaft, a gimbal mounted on the drive shaft and capable of being driven by the shaft, a cutting blade mounted on the gimbal, means for causing the cradle to move from a stationary, non-cutting position toward the axis of the tube, and return, and means for causing the gimbal to move parallel with respect to the axis of the drive shaft comprising a source of air, means for introducing air from the source into a bore in the drive shaft, means for causing the air introducing means to function and cease functioning, and spring means to cause the gimbal to move along the drive shaft when the supply of air from the source is shut off.

15. A tube cutting machine for cutting predetermined lengths of tubing from a continuously moving tube, said machine having a carriage, a drive shaft rotatably mounted on said carriage and having a projecting end portion, motor means for driving said shaft, a rotatable blade holder surrounding said end portion, a rotary tube cutter rigidly mounted on said holder, a fluid pressure motor comprising an elongated cylinder surrounding the projecting end portion of said shaft and rigidly connected to said blade holder for effecting axial movement of said holder, means for supporting said holder and said cylinder coaxial with said shaft for axial sliding movement on said shaft and for causing said holder and said cylinder to rotate in unison with said shaft, means for moving said carriage in a direction transverse to the axis of said tube between a non-cutting position and a cutting position, wherein the teeth of said cutter engage said tube, means for causing sliding of said blade holder on said shaft in the direction of feed of the tube including a source of fluid under pressure and means for supplying said fluid under pressure through a passage in said shaft to the end of said cylinder to advance the end of the cylinder in said direction of feed and away from the end of said shaft, valve means for varying the rate of flow of fluid to said cylinder, means for discontinuing the application of pressure to said cylinder, and means for retracting said cylinder when the pressure thereon is reduced.

16. A tube cutting machine as defined in claim 15 wherein fluid pressure means are provided for moving said carriage between said non-cutting and cutting positions, and valve means are provided for varying the speed of movement of said carriage.

17. A tube cutting machine as defined in claim 15 wherein said blade holder and said shaft are provided with a spline to permit axial sliding of the blade holder on the shaft and the fluid introduced to said cylinder is exhausted along the grooves of said spline, whereby said holder rides on a cushion provided by said fluid.

18. A tube cutting machine as defined in claim 17 wherein means are provided for injecting a lubricant into said fluid to reduce the friction between the keys and grooves of said spline.

19. A tube cutting machine for cutting predetermined lengths of tubing from a continuously moving tube, said machine having a carriage (16), a hollow drive shaft (17) rotatably mounted on said carriage parallel to the direction of feed of said tube and having a projecting end portion, motor means (30) for driving said shaft, a gimbal (18) surrounding said end portion and slidably mounted thereon to move in the direction of the shaft axis, a rotary tube cutter (19) mounted on said gimbal, axially slidable means (57) connecting the gimbal to the shaft to cause the cutter to rotate in unison with the shaft, means (34, 38) for advancing and retracting said carriage in a direction transverse to the axis of said tube between a non-cutting position and a cutting position, variable speed means (86, 48, 54) independent of the movement of said tube for driving the gimbal in the direction of feed of said tube, and means for retracting the gimbal in the opposite direction comprising a spring (62) mounted within the hollow drive shaft and means (61) connecting said spring to said gimbal.

References Cited by the Examiner
UNITED STATES PATENTS

| 1,643,994 | 10/1927 | Parsons | 83—318 X |
| 1,709,369 | 4/1929 | Ostrander | 83—318 X |
| 2,632,232 | 3/1953 | Wilson et al. | 83—318 X |

FOREIGN PATENTS

| 1,214,318 | 11/1959 | France. |

WILLIAM W. DYER, JR., *Primary Examiner.*

J. MEISTER, *Assistant Examiner.*